April 24, 1928.
E. L. PEACOCK
1,667,011
SHOCK ABSORBER
Filed Feb. 23, 1926
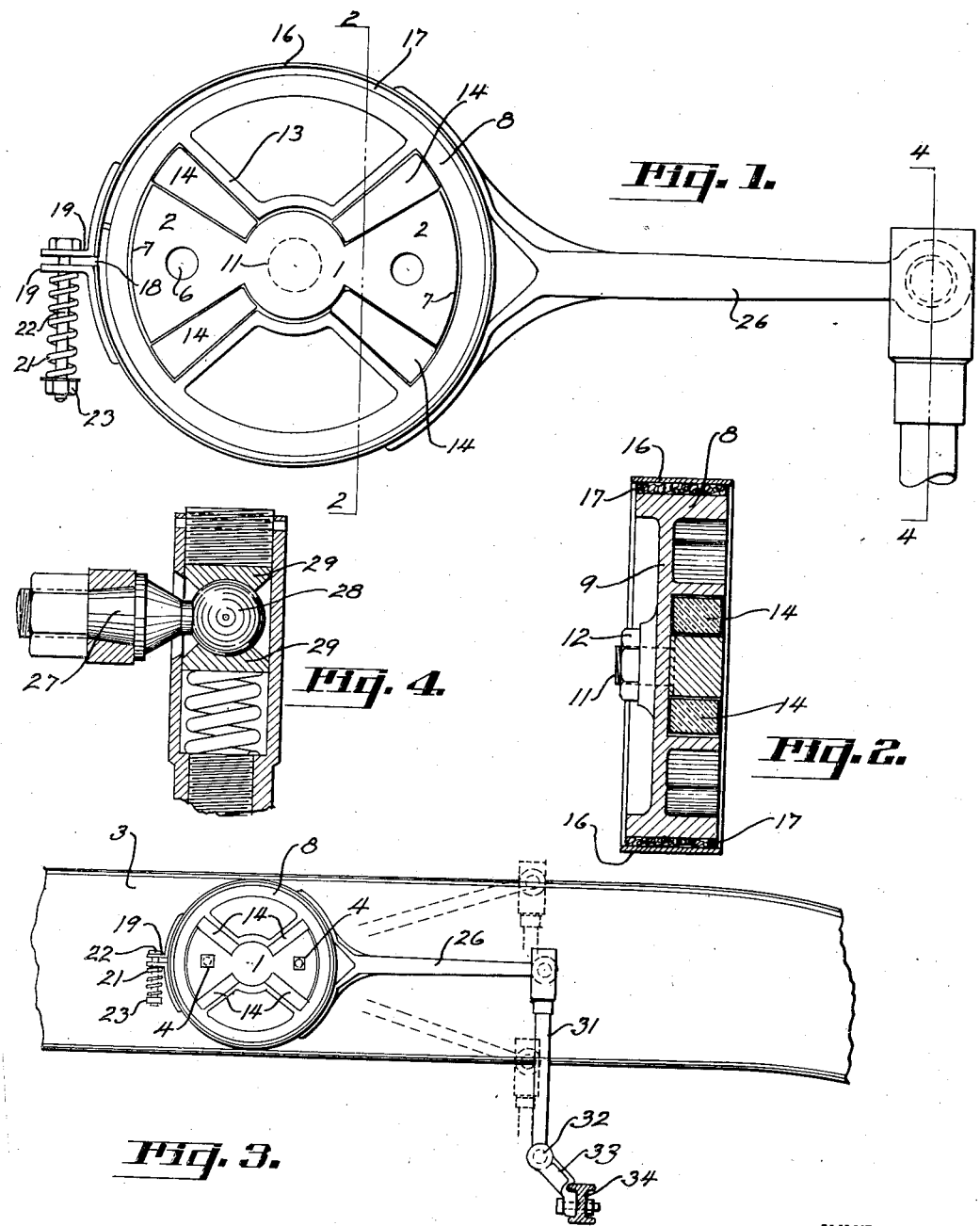

Patented Apr. 24, 1928.

1,667,011

UNITED STATES PATENT OFFICE.

ELISHA LEONARD PEACOCK, OF SAN FRANCISCO, CALIFORNIA, ASSIGNOR TO GEORGE A. PEACOCK, OF SAN FRANCISCO, CALIFORNIA.

SHOCK ABSORBER.

Application filed February 23, 1926. Serial No. 90,017.

The present invention relates to improvements in shock absorbers for motor vehicles and its principal object is to provide a novel construction particularly effective in absorbing shocks transmitted from the axle of a vehicle to the frame thereof. It is particularly proposed in this connection to provide two elements associated with the frame and the axle of the vehicle respectively which are caused to revolve one relative to the other under the influence of shocks received by the vehicle wheel and radial members radiating from the two revolving elements in spaced and alternating relation with cushioning means filling the spaces so that relative movement of the two elements involves a compressing of the cushion means. It is further proposed to combine a feature relying on frictional resistance with the cushioning feature. Further objects and advantages of the invention will appear as the specification proceeds.

The preferred form of the invention is illustrated in the accompanying drawing in which Figure 1 shows my shock absorber in side elevation, Figure 2 shows a vertical section taken along line 2—2 of Figure 1, Figure 3 shows an assembly view of my shock absorber in connection with the frame and axle of a vehicle, and Figure 4 a sectional detail view taken along line 4—4 of Figure 1.

While I have shown only the preferred form of the invention it should be understood that various changes or modifications may be made within the scope of the claims hereto attached, without departing from the spirit of the invention.

One of the elements of my shock absorber comprises a hub portion 1 having two arms 2 radially extending therefrom which latter are adapted to be fastened to the frame 3 of a motor vehicle by means of bolts 4 extending through perforations 6 in the arms and corresponding perforations in the frame. The outer faces 7 of the two arms are arc shaped and allow a ring 8 to revolve thereon which latter ring is the peripheral flange of a disc 9. This disc is perforated centrally and rides on a reduced extension 11 of the hub portion 1 and is held in place by means of a nut 12. The ring 8 has radial elements 13 extending inwardly therefrom in alternating and spaced relation with the arms 2 of the hub 1 and cushioning members 14 are interposed between the arms 2 and the members 13, the cushioning members being preferably made of rubber.

A second ring or band 16 surrounds the first ring 8 and is provided with any suitable kind of brake lining 17, the ring 16 being split as shown at 18 and provided with brackets 19 on opposite sides of the split which latter are forced toward one another by means of a spring 21 guided on a bolt 22 and compressed between one of the brackets 19 and a nut 23.

A bracket 26 extends from a peripheral section of the second ring 16 and has a bolt 27 extending through the end thereof which latter terminates in a ball 28 adapted to be received in a socket 29 in the standard 31 which latter may be pivoted, as shown at 32 to a bracket 33 fixed to the axle 34.

My shock absorber operates as follows:—

A shock received by the axle through the wheels forces the extremity of the bracket 26 upward and causes the two rings 16 and 8 to revolve relative to the stationary hub 1 whereby the cushioning blocks 14 are compressed, causing the latter to absorb the shock. In shocks of minor nature the cushioning members 14 absorb the entire shock and the relation between the two rings 8 and 16 remains undisturbed due to the frictional resistance offered by the brake band 17.

Where a heavy shock is transmitted so that the cushioning members 14 reach the limit of their compressibility the frictional resistance of the brake band lining is overcome sufficiently to allow the outer ring 16 to move relative to the inner one so that in such instances there will be slight additional revolving motion of the ring 16 besides that transmitted to the ring 8. The frictional resistance to the brake lining may be adjusted by means of the nut 23.

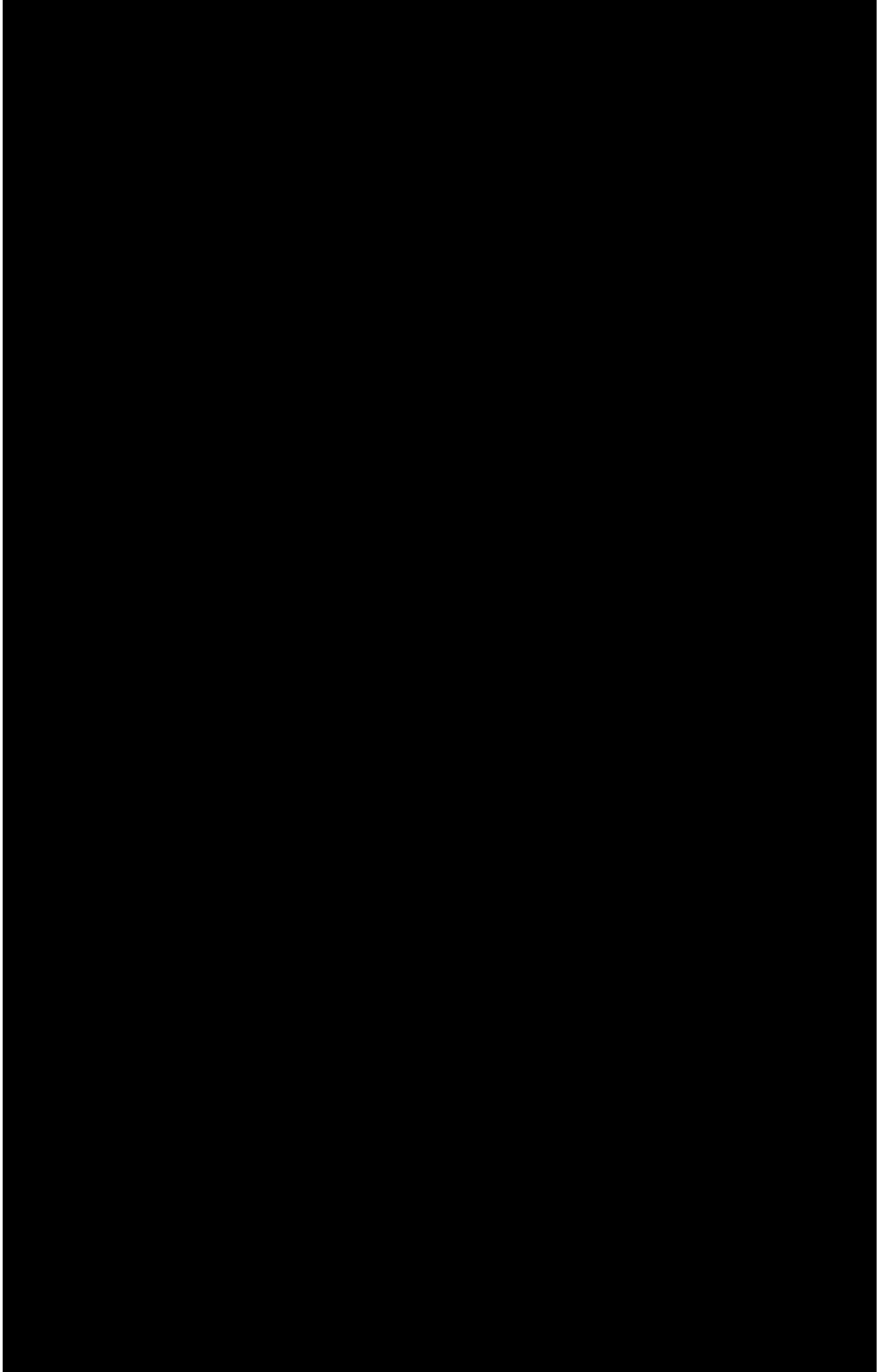

I claim:

1. A shock absorber for vehicles comprising a hub fixedly attached to the frame of the vehicle, a plurality of radial arms integral with the hub, a drum mounted for rotary movement about the hub and arms, inwardly extending segments on the drum and spaced between the arms, cushioning means filling the space between the segments and the arms, and means connected to the axle and frictionally engaged with said drum.

2. A shock absorber for vehicles compris-